US010231895B2

(12) United States Patent
Girardini et al.

(10) Patent No.: US 10,231,895 B2
(45) Date of Patent: Mar. 19, 2019

(54) PATH CALCULATOR FOR USERS WITH MOBILITY LIMITATIONS

(71) Applicant: International Business Machines Corporation, Armonk, NY (US)

(72) Inventors: Serena Girardini, Rome (IT); Andrea Ianni, Giulianova (IT); Marco Imperia, Rome (IT); Valeria Perticará, Rome (IT); Roberto Piras, Rome (IT)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 15/424,214

(22) Filed: Feb. 3, 2017

(65) Prior Publication Data

US 2018/0221236 A1    Aug. 9, 2018

(51) Int. Cl.
*A61H 3/00* (2006.01)
*H04W 4/02* (2018.01)
(Continued)

(52) U.S. Cl.
CPC ........... *A61H 3/00* (2013.01); *G01C 21/3407* (2013.01); *G01C 21/362* (2013.01);
(Continued)

(58) Field of Classification Search
CPC .. A61H 3/00; G01C 21/3407; G01C 21/3614; G01C 21/362; G01C 21/3641;
(Continued)

(56) References Cited

U.S. PATENT DOCUMENTS 7,197,395 B2 *   3/2007   Kishigami .......... G01C 21/3641
                                                    340/995.21
9,109,908 B2 *   8/2015   Bach ...................... G01C 21/32
                  (Continued)

FOREIGN PATENT DOCUMENTS

CN          102186141 B       11/2013
JP             4349143 B2     10/2009

OTHER PUBLICATIONS

Sobek, et al.: "U-Access: A Web-Based System for Routing Pedestrians of Differing Abilities", Journal of Geographical Systems, vol. 8, Issue 3, Apr. 26, 2006, pp. 269-287.
(Continued)

*Primary Examiner* — Krishnan Ramesh
(74) *Attorney, Agent, or Firm* — Patterson & Sheridan, LLP (57) ABSTRACT

Method, system, and computer program product for providing turn-by-turn directions to mobility impaired individuals. Movement of users associated with certain mobility classes are tracked to determine when the users deviate from certain geographical features, such as sections of sidewalk. In the event of a deviation, a reliability score for that geographical feature is decreased. When another user of the same mobility class requests directions and a candidate path uses the same geographical feature, the decreased reliability score is applied to that candidate path to provide the other user with an indication that the path may be difficult to traverse. The user may select a different candidate path with a higher reliability score.

20 Claims, 5 Drawing Sheets

(51) Int. Cl.
*G01C 21/34* (2006.01)
*G01C 21/36* (2006.01)
*H04M 1/725* (2006.01)

(52) U.S. Cl.
CPC ..... *G01C 21/3614* (2013.01); *G01C 21/3641* (2013.01); *G01C 21/3661* (2013.01); *G01C 21/3676* (2013.01); *G01C 21/3694* (2013.01); *H04M 1/72588* (2013.01); *H04W 4/025* (2013.01)

(58) Field of Classification Search
CPC ............ G01C 21/3661; G01C 21/3676; G01C 21/3694; H04M 1/72588; H04W 4/025
USPC ......................................................... 701/418
See application file for complete search history.

(56) References Cited

U.S. PATENT DOCUMENTS

| | | | | |
|---|---|---|---|---|
| 9,207,089 | B2* | 12/2015 | Friedlander | G01C 21/3492 |
| 9,942,701 | B2* | 4/2018 | Mappus, IV | H04W 4/02 |
| 2004/0199325 | A1* | 10/2004 | Kishigami | G01C 21/3641 |
| | | | | 701/417 |
| 2006/0146719 | A1* | 7/2006 | Sobek | G01C 21/20 |
| | | | | 370/238 |
| 2011/0238291 | A1* | 9/2011 | Bach | G01C 21/32 |
| | | | | 701/533 |
| 2013/0085671 | A1* | 4/2013 | Friedlander | G01C 21/3492 |
| | | | | 701/527 |
| 2013/0131985 | A1* | 5/2013 | Weiland | G01C 21/20 |
| | | | | 701/516 |
| 2017/0165147 | A1* | 6/2017 | Ng | A61H 3/061 |
| 2017/0199052 | A1* | 7/2017 | Oh | G01C 21/3415 |
| 2017/0295457 | A1* | 10/2017 | Mappus, IV | H04W 4/02 |

OTHER PUBLICATIONS

Kulakov, et al.: "The Route Planning Services Approach for People With Disability", Proceeding of the 17th Conference of Fruct Association, Apr. 24-25, 2015, pp. 90-95.

* cited by examiner

PATH CALCULATOR FOR USERS WITH MOBILITY LIMITATIONS

BACKGROUND

Mobile computing devices with built-in geo-locating capabilities (e.g., GPS receivers) typically include applications that enable users to receive turn-by-turn directions to their respective destinations quickly and efficiently. On existing devices, the turn-by-turn directions are tailored to the general population and do not take into account mobility limitations of certain users. For example, an able-bodied person may be able to traverse a sidewalk with cracked or uneven cement, but the same sidewalk would be challenging or impractical for a person in a wheelchair to traverse. As a result, turn-by-turn directions that include that sidewalk may be unhelpful for such a disabled person.

SUMMARY

According to one embodiment of the present invention, a method comprises receiving tracking progress data for a plurality of users associated with a first mobility class along respective calculated paths to destinations in the geographical area for a geographical area comprising a plurality of geographical features. The method also comprises, upon the received tracking progress data indicating that one or more users of the first mobility class have deviated from the respective calculated paths, decreasing reliability scores for geographical features within the geographical area from which the users deviated. The method also comprises receiving a destination location from a first subject user, wherein the first subject user is associated with the first mobility class. The method also comprises calculating a plurality of candidate paths from a current location of the first subject user to the received destination location. The method also comprises calculating respective path reliability scores for the calculated plurality of candidate paths, based on the respective reliability scores for the geographical features included in the candidate paths. The method also comprises ordering the plurality of candidate paths based on at least one of the path reliability scores, total distances traveled for the candidate paths, or times of travel for the candidate paths. The method also comprises outputting the ordered plurality of candidate paths for display to the first subject user.

According to one embodiment of the present invention, a system comprises a computer processor. The system also comprises an input operable to receive tracking progress data from a plurality of mobile devices carried by respective users, wherein the plurality of mobile devices are configured to identify mobility classes of the respective users. The input is also operable to receive destination information and candidate path selections from the mobile devices. The system also includes an output operable to communicate candidate paths to the mobile devices. The system also includes computer memory storing a data structure of geographical features within a geographical area and respective reliability scores associated with the geographical features. The computer memory also stores an application, executable on the computer processor to analyze received tracking progress data for a plurality of mobile devices associated with a first mobility class along respective calculated paths to destinations. The application is further executable to, upon the tracking progress data indicating that one or more users of the plurality of mobile devices have deviated from the respective calculated paths, decrease reliability scores for geographical features within the geographical area from which the users deviated. The application is further executable to receive a destination location from a subject mobile device, wherein a subject user of the subject mobile device is associated with the first mobility class. The application is further executable to calculate a plurality of candidate paths from a current location of the subject mobile device to the received destination location. The application is further executable to calculate respective path reliability scores for the calculated plurality of candidate paths, based on the respective reliability scores for the geographical features included in the candidate paths. The application is further executable to order the plurality of candidate paths based on at least one of the path reliability scores, total distances traveled for the candidate paths, or times of travel for the candidate paths. The application is further executable to output the ordered plurality of candidate paths to the subject mobile device.

According to one embodiment of the present invention, a computer program product for providing turn-by-turn directions to users is provided. The computer program product comprises a computer-readable storage medium having program instructions embodied therewith. The program instructions are executable by a processor to perform an operation comprising receiving tracking progress data for a plurality of users associated with a first mobility class along respective calculated paths to destinations within a geographical area comprising a plurality of geographical features. The operation further comprises upon the tracking progress data indicating that one or more users of the mobility class have deviated from the respective calculated paths, decreasing reliability scores for geographical features within the geographical area from which the users deviated. The operation further comprises receiving a destination location from a subject user, wherein the subject user is associated with the first mobility class. The operation further comprises calculating a plurality of candidate paths from a current location of the subject user to the received destination location. The operation further comprises calculating respective path reliability scores for the calculated plurality of candidate paths, based on the respective reliability scores for the geographical features included in the candidate paths. The operation further comprises ordering the plurality of candidate paths based on at least one of the path reliability scores, total distances traveled for the candidate paths, or times of travel for the candidate paths. The operation further comprises outputting the ordered plurality of candidate paths for display to the subject user.

DETAILED DESCRIPTION

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In embodiments described herein, users with mobility limitations are provided with turn-by-turn directions that account for their particular mobility limitations. By tracking a group of users with a particular mobility limitation (i.e., a mobility class), areas that are unreliable for travel by users of that mobility class can be identified. For example, if a user in a wheelchair is following turn-by-turn directions along a candidate path to a destination but deviates from the candidate path (e.g., turns around or turns off the candidate path), then reliability scores for geographical features (e.g., streets, sidewalks, stairs, and ramps) from which the user deviated can be decreased. When a next user of the same mobility class requests turn-by-turn directions to a destination and a candidate path to the destination includes or would include those same geographical features, a reliability score for that candidate path can be decreased relative to other candidate paths that do not include those geographical features. The user is provided with multiple candidate paths along with indications of the reliability scores for the different candidate paths. The user may then select a candidate path. As an example, a first candidate path may be longer than a second candidate path, but the first candidate path may have a better reliability score than the second candidate path. The user can then decide if a shorter travel distance is worth a higher risk that a portion of the selected candidate path will be unpassable.

Figure 1:
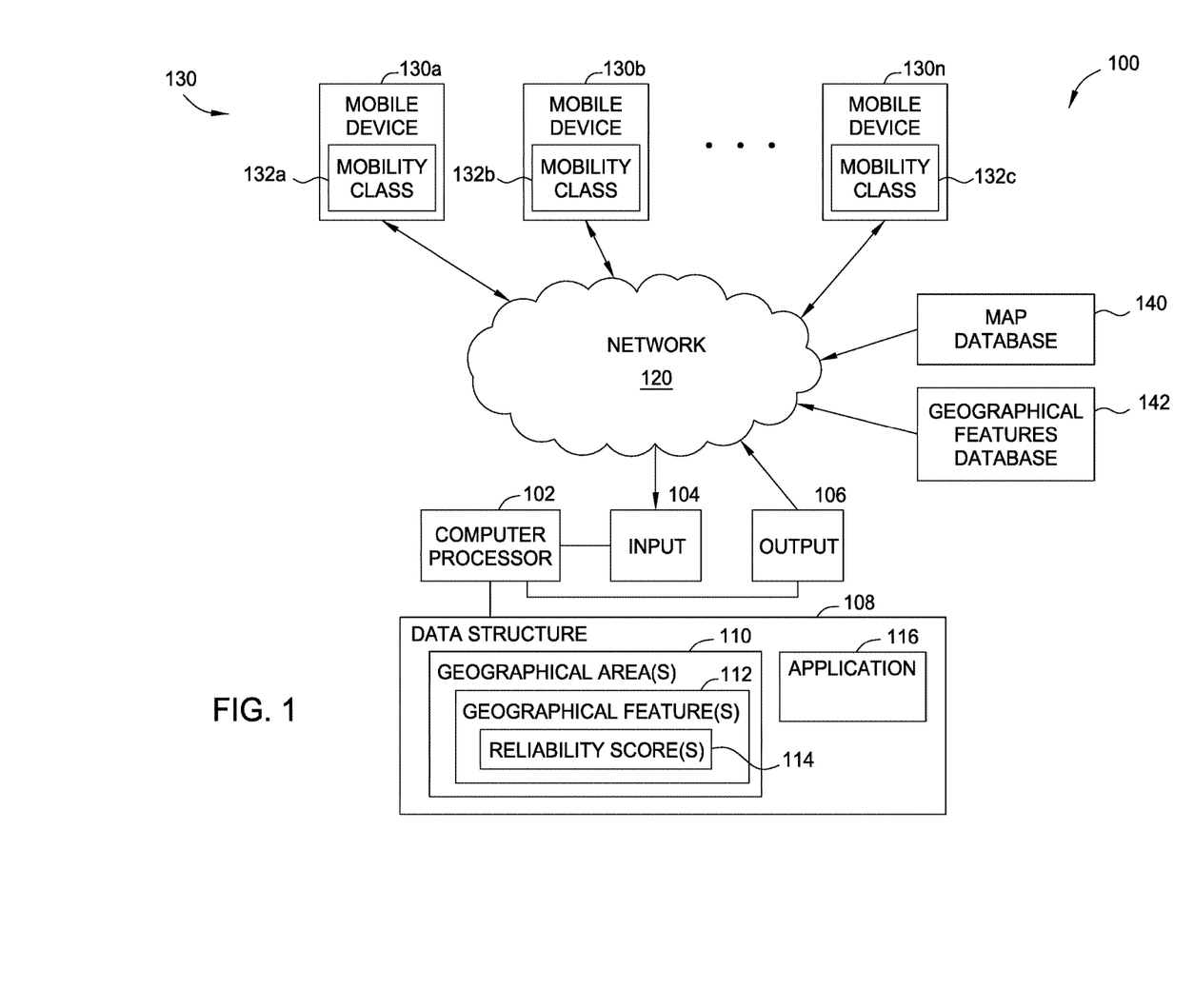
FIG. 1 is a block diagram of a system, according to one embodiment.

FIG. 1 is a block diagram of a system 100 operable to provide turn-by-turn directions to users of different mobility classes. The system 100 includes a computer processor 102 that is in communication with an input 104 and an output 106. The input 104 is operable to receive tracking progress data from a plurality of mobile devices 130. The mobile devices 130 could include smart phones, tablet computers, dedicated GPS devices, or any other mobile devices that include geo-location capabilities. The mobile devices 130 include configurable settings that users of the respective mobile devices 130 can select settings to indicate particular mobility classes 132. For example, the user of a first mobile device 130a may be in a wheelchair, and an associated mobility class 132a may be configured to indicate wheelchair use. As another example, the user of a second mobile device 130b may be blind, and an associated mobility class 132b may be configured to indicate "blindness." As another example, the user of an nth mobile device 130n may not be able to walk up more than two or three stairs, and an associated mobility class 132n may be configured to indicate "limited stairs." In various embodiments, a user may select more than one mobility class 132, if applicable. The mobility classes 132 may include particular mobility limitations, such as maximum distance that a person can walk or a maximum number of stairs that a person can climb. The mobility classes 132 may also include particular mobility assistance devices used by the users (e.g., wheelchairs, crutches, or walkers), and the use of such mobility assistance devices may indicate particular mobility limitations. For example, a person in a wheelchair is unlikely to be able to traverse a curb. As another example, someone using crutches may have difficulty with uneven and/or broken pavement.

The input 104 receives the mobility class information from the mobile devices 130 (e.g., metadata transmitted by the mobile devices 130) via a computer network 120 (e.g., the Internet). The input 104 also receives location data from the mobile devices 130 such that the computer processor 102 can track the user's progress along a selected candidate path. As the users of the mobile devices 130 follow turn-by-turn directions toward a destination, location data from the mobile devices 130 is transmitted from the respective mobile devices 130 to the input 104. Additionally, deviations from the turn-by-turn directions are detected by the computer processor 102 when the location data from a mobile device 130 received by the input 104 differs from the locations along a candidate path that the directions follow.

The system 100 also includes computer memory 108. The computer memory 108 stores a data structure of one or more geographical areas 110. For example, a geographical area 110 may be a particular city, county, state, or country. As another example, a geographical area 110 could be an entire continent or the entire planet. The data structure of the one or more geographical areas 110 includes information on geographical features 112 within the geographical area. For example, the geographical features 112 could include streets, sidewalks, stairs, curbs, ramps, and crosswalks. The geographical features 112 could also include certain mobility aids, such as wheelchair elevators, curb ramps, and audible crosswalk signals. The data structure of geographical features 112 includes reliability scores 114 associated with the various geographical features 112. As discussed in greater detail below, the reliability scores 114 for the different geographical features 112 can include a plurality of different reliability scores 114 associated with different respective mobility classes, and the reliability scores 114 can be updated in real-time or near real-time in the event a user of a particular mobility class deviates from particular geographical features 112 while following turn-by-turn directions.

The computer memory 108 also stores an application 116 that is executable on the computer processor 102 to provide turn-by-turn directions to mobile devices 130 of users of different mobility classes. The application 116 analyzes the tracking progress data for a plurality of users associated with different mobility classes along respective calculated paths to destinations. Upon the tracking progress data indicating that one or more users have deviated from the respective calculated paths, the application 116 decreases reliability scores for geographical features within the area from which the user's deviated. For example, if one or more users in wheelchairs deviate from a particular sidewalk (as shown by the tracking progress data), then the reliability score for that sidewalk (i.e. geographical feature) is decreased. As discussed above, the reliability score for that particular sidewalk could include several different reliability scores associated with different mobility classes. As a result, the decreased reliability score for the sidewalk for wheelchair-bound users would not necessarily affect the reliability score for that sidewalk for users in other mobility classes.

The application 116 also generates candidate paths to a received destination location from a subject mobile device 130, wherein the subject mobile device 130 includes one or more mobility class indications 132 associated with the user of the mobile device 130. Upon receiving the destination location and the one or more mobility class indications 132 from the subject mobile device 130, the application 116 calculates a plurality of candidate paths from a current location of the subject mobile device 130 to the received destination location. The application 116 also calculates respective path reliability scores for the calculated plurality of candidate paths, based on the respective reliability scores for the geographical features included in the candidate paths. In at least one embodiment, the application 116 also calculates at least one of a total distance or a total time of travel for the calculated plurality of candidate paths. The application 116 thereafter orders the plurality of candidate paths based on at least one of the calculated path reliability scores, the calculated total distances, and calculated times of travel. Thereafter, the application 116 outputs the ordered plurality of candidate pass to the subject mobile device 130 via the output 106.

In addition to the data structure of geographical areas 110 in the computer memory 108, in certain embodiments, the system 100 can also receive data related to geographical features and geographical areas from remote data centers. For example, the system 100 could be in communication with a map database 140, such as Google® maps or Navteq®, that includes updated map data. The system 100 could also be in communication with one or more geographical features databases 142 that include up-to-date information on the statuses of various geographical features. For example, a geographical features database 142 could be a city public works website that lists streets, sidewalks, staircases, and ramps that are temporarily closed or under construction.

Figure 2:
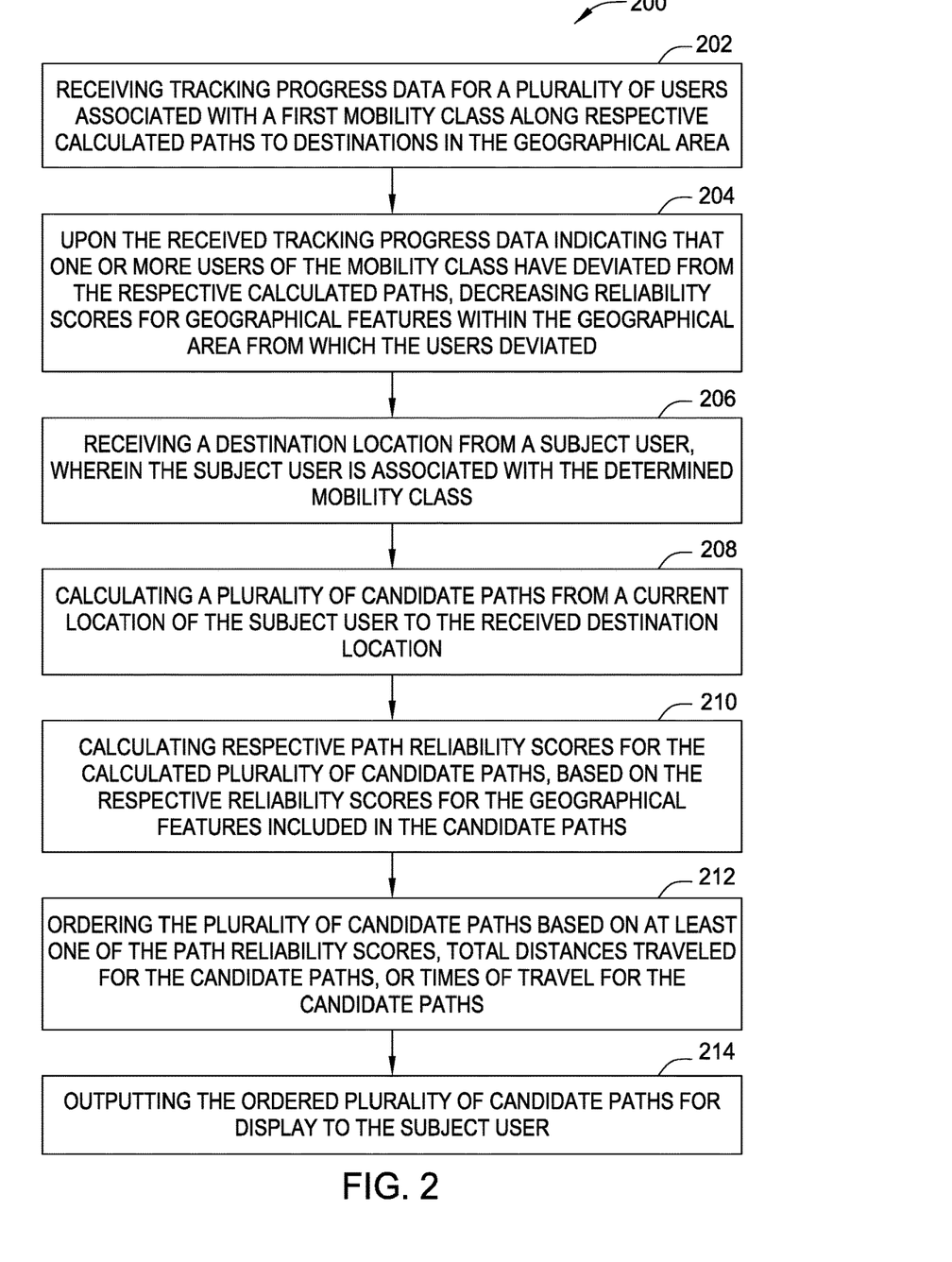
FIG. 2 is a flowchart of a method, according to one embodiment.

FIG. 2 is a flowchart illustrating a method 200, according to one embodiment, for providing turn-by-turn directions to users having different mobility classes. In block 202, the method receives tracking progress data for a plurality of users associated with a first mobility class along respective calculated paths to destinations in a geographical area. The first mobility class could be for users in wheelchairs, for example. The tracking progress data can include a progression of latitudes, longitudes, and/or altitudes detected by GPS or other satellite-based location determining systems incorporated into mobile devices of the users.

In block 204, the method 200 decreases reliability scores for geographical features with in the geographical area from which the user's associated with the first mobility class deviated. As discussed above, the method 200 can, in some embodiments, detect from the tracking progress data indications that the user has deviated from a respective calculated path. For example, if a progression of latitudes, longitudes and/or altitudes from the mobile devices 130 of a user does not match the latitudes, longitudes, and/or altitudes of the candidate path being followed, then the user has deviated from the candidate path. In certain embodiments, the method 200 may identify a deviation even if the user is not following turn-by-turn directions along a candidate path. For example, the method 200 could perform a backward-looking analysis on the path a particular user took to get to a particular location. For example, a user may start at a particular location on a straight street and end at a different location along that same street. Although the user in this exemplary scenario did not use turn-by-turn directions, a backward looking analysis would recognize that the shortest, fastest path between the start and end locations is along that straight street. If the user deviated from that street, then the method 200 could identify the portions of the street that the user deviated from and decrease reliability scores for geographical features along that portion of the street.

In one embodiment, the reliability scores for geographical features may be decreased by an incremental amount every time a user of a particular mobility class deviates there from. For example, if a first user in a wheelchair deviates from a particular sidewalk that was part of a candidate path being followed by that first user, then the reliability score for that sidewalk or portion of sidewalk could be decreased from 100% to 90%. If the second user in a wheelchair deviates from the particular sidewalk, then the reliability score for that sidewalk could be decreased a second time from 90% to 80%. Such incremental decreasing of the reliability scores for geographical features may prevent "false positive" deviations from overly decreasing the reliability score for a particular geographical feature. For example, a wheelchair user may deviate from a sidewalk because the sidewalk is broken, uneven, or missing a ramp. However, the same wheelchair user may deviate from the sidewalk to stop in a store or say hello to a friend. Both of these exemplary scenarios result in the reliability score for that sidewalk being decreased. If the reliability score were treated as a binary value (i.e., "reliable" or "unreliable"), then a circumstance in which the user deviates for a reason unrelated to mobility considerations could unnecessarily reduce the use of the sidewalk by other people with the same mobility considerations. Incrementally decreasing the reliability scores enables all deviations to be captured and accounted for in the reliability scores, thereby reducing the impact such "false positive" deviations have on the reliability scores.

In certain embodiments, the method 200 can increase the reliability scores for geographical features after the reliability scores for the geographical features were decreased. For example, a particular geographical feature may be unreliable for a certain period of time but then become reliable again. For example, a wheelchair ramp may be closed to undergo repairs, but then re-opens after the repairs are completed. As another example, a construction fence may temporarily block a portion of a sidewalk such that a wheelchair cannot use the sidewalk, but the construction fence is eventually removed such that the sidewalk is usable by a wheelchair user. In certain aspects, data may be provided that enables the method 200 to increase the reliability score for a particular geographical feature. For example, with reference to FIG. 1, the system 100 may receive information from a municipal public works website (i.e., a geographical features database 142) that indicates that a previously-broken sidewalk section has been replaced. As a result, the method 200 may increase the reliability score 114 associated with that sidewalk and also associated with wheelchair users. As another example, the method 200 may increase the reliability score 114 associated with a particular geographical feature 112 and with a particular mobility class in the event a user of the particular mobility class successfully uses that geographical feature. For example, a particular sidewalk may have a low reliability score for wheelchair users because a number of wheelchair users were unable to traverse broken, uneven pavement of that sidewalk. In the event another wheelchair user traverses the sidewalk, the method 200 could assume that the defects in the sidewalk affecting wheelchair users have been remedied. As a result, the reliability score for that sidewalk section could be increased. In one embodiment, the method 200 increases the reliability score to the full score (e.g., from 80% to 100%)

in such instances. In various other embodiments, the method 200 incrementally increases the reliability score in such instances.

In block 206, the method 200 receives a destination location from a subject user. The subject user is associated with the same first mobility class as the previous users. In addition to providing the destination location, the user may also provide a starting location (i.e., a starting address). Alternatively, the mobile device 130 of the user may provide its location, and the method 200 may use the location of the mobile device as the starting location.

In block 208, the method 200 calculates a plurality of candidate paths from a current location (or starting location) of the subject user to the received destination location. The respective ones of the plurality of candidate paths may have different travel times and/or travel distances. Additionally, the respective ones of the plurality of candidate paths may utilize different types of geographical features. For example, a first candidate path may use only sidewalks and crosswalks to direct a user to a destination location whereas a second candidate path may use some sidewalks and crosswalks but also a path through a park to direct the user to the destination location.

In block 210, the method 200 calculates respective path reliability scores for the calculated plurality of candidate paths. The path reliability scores are based on the respective reliability scores for the geographical features included in the candidate paths. In one embodiment, the path reliability scores for the candidate paths are equal to the lowest reliability score for the geographical features included in the respective candidate paths. In another embodiment, the path reliability scores for the candidate paths is a weighted average or an unweighted average of the reliability scores for the geographical features included in the respective candidate paths.

In block 212, the method 200 orders the plurality of candidate paths based on at least one of the path reliability scores, the total distances of the respective candidate paths, or travel times of the respective candidate paths. For example, in one embodiment, the method 200 arranges the candidate paths based on the path reliability scores in descending order. In another embodiment, the method 200 arranges the candidate paths based on the total distances of the respective candidate paths in descending order. In another embodiment, the method 200 arranges the candidate paths based on the travel times of the respective candidate paths in descending order. In another embodiment, the method 200 arranges the candidate paths based on a combination of the respective path reliability scores and total distances and/or travel times for the respective candidate paths.

In block 214, the method 200 outputs the ordered plurality of candidate paths for display to the subject user. As discussed in greater detail below, the method 200 could output the ordered plurality of candidate paths such that the candidate paths are overlaid on a map of the geographical area that includes the location for which the user has requested directions. The method 200 could also output an indication of the path reliability scores for the different candidate paths. In certain embodiments, the candidate paths may be audibly output for users with vision issues (e.g., blindness). For example, the method 200 could convert a total travel distance aspect, total time of travel aspect, and/or path reliability score aspects for the different candidate paths to speech. Then, the method 200 could present the candidate paths to the user by audibly outputting the spoken aspects of the respective candidate paths. For example, in one scenario, the spoken output could state that "Candidate path A has a travel distance of 0.4 miles and a path reliability score of 80% and Candidate path B has a travel distance of 0.3 miles and a path reliability score of 50%."

In various embodiments, after the user selects a particular one of the candidate paths, the method 200 can provide turn-by-turn directions to the subject user. As with the previous users of the same mobility class, the method 200 can receive tracking data for the subject user and, upon the received tracking progress data for the subject user indicating that the subject user has deviated from the selected candidate path, decrease reliability scores for geographical features from which the subject user deviated. These additional and/or updated reliability scores can be used to calculate candidate paths for future users the same mobility class.

Figure 3:
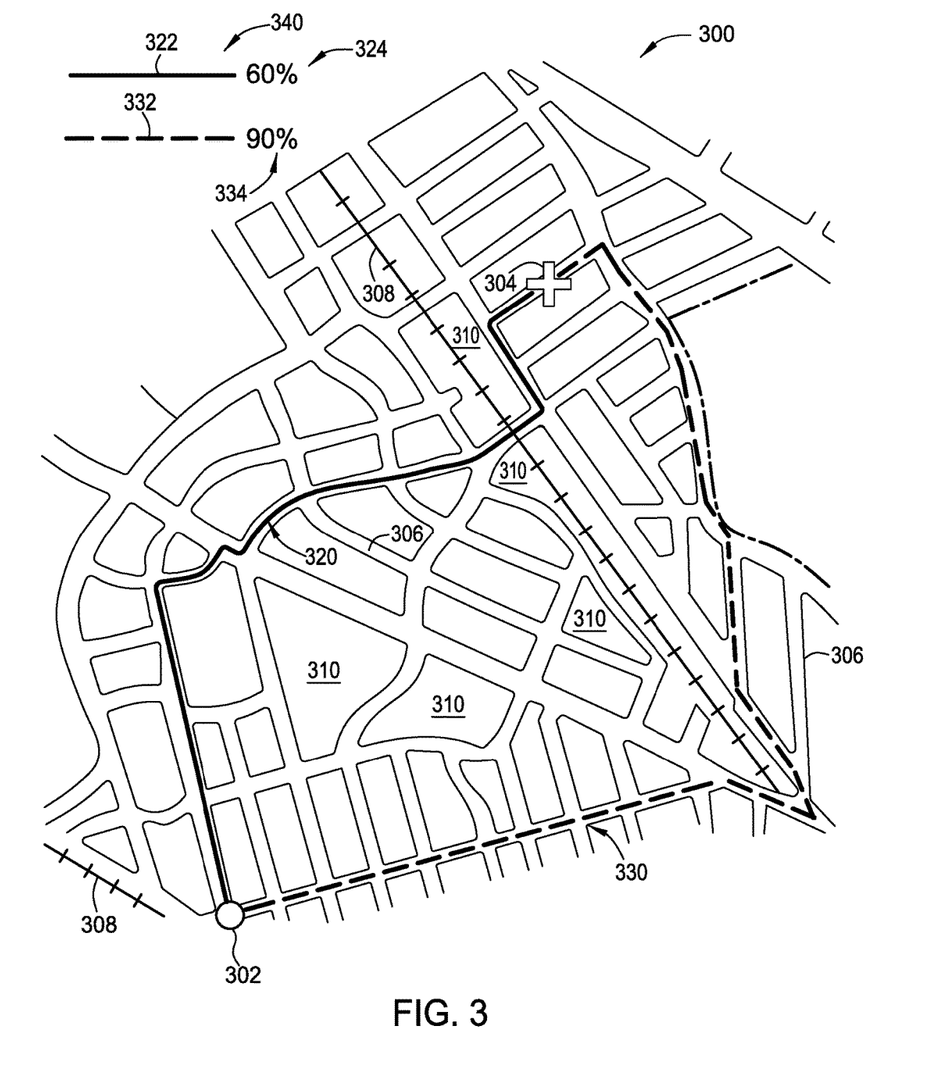
FIG. 3 is an exemplary map with multiple candidate paths, wherein the candidate paths are ordered based on total travel distance.

FIG. 3 is an exemplary display on a mobile device 130 that may be presented to the user of the mobile device. The display shows a geographical area 300 that includes various geographical features, such as roads 306, parks 310, and railroad tracks 308. The geographical features could be more granular such that they include additional details such as sidewalks, ramps from streets to sidewalks, stairs, gravel paths, and at-grade railroad crossings. A current location 302 of the user is overlaid on the geographical area 300 and represented in this exemplary embodiment as a circle. A destination location 304 of the user is also overlaid on the geographical area 300 and represented in this exemplary embodiment as an "X." The display shows a first candidate path 320 (illustrated in solid line) and a second candidate path 330 (illustrated in broken line). In the exemplary scenario illustrated in FIG. 3, the first candidate path 320 is shorter than the second candidate path 330. In this embodiment, the candidate paths are ordered based on total distance in descending order. As a result, a legend 340 for the display includes a legend entry 322 for the first candidate path 320 above a legend entry 332 for the second candidate path 330. The legend 340 also includes path reliability scores for the first and second candidate paths 320 and 330. In the exemplary scenario, the legend 340 includes a first path reliability score entry 324 of 60% for the first candidate path 320 and a second path reliability score entry 334 of 90% for the second candidate path 330. As discussed above, previous users belonging to a particular mobility class have deviated from one or more geographical features of the first candidate path 320 and the second candidate path 330, and those deviations have decreased the reliability scores for those geographical features and the path reliability scores for the resulting candidate paths.

The user of the mobile device, belonging to the same mobility class, is provided with the information in this display to decide which of the two candidate paths to select. For example, by overlaying the first candidate path 320 and the second candidate path 330 on the map of the geographical area 300, the user is given a sense of the difference in distances between the two candidate paths 320 and 330. It is then up to the user to decide if the increased risk, indicated by the lower path reliability score, for the first candidate path 320 is worth the decreased travel distance. The user can select one of the candidate paths 320 and 330 and is then provided with turn-by-turn directions from the current location 302 to the destination location 304 along the selected candidate path.

Figure 4:
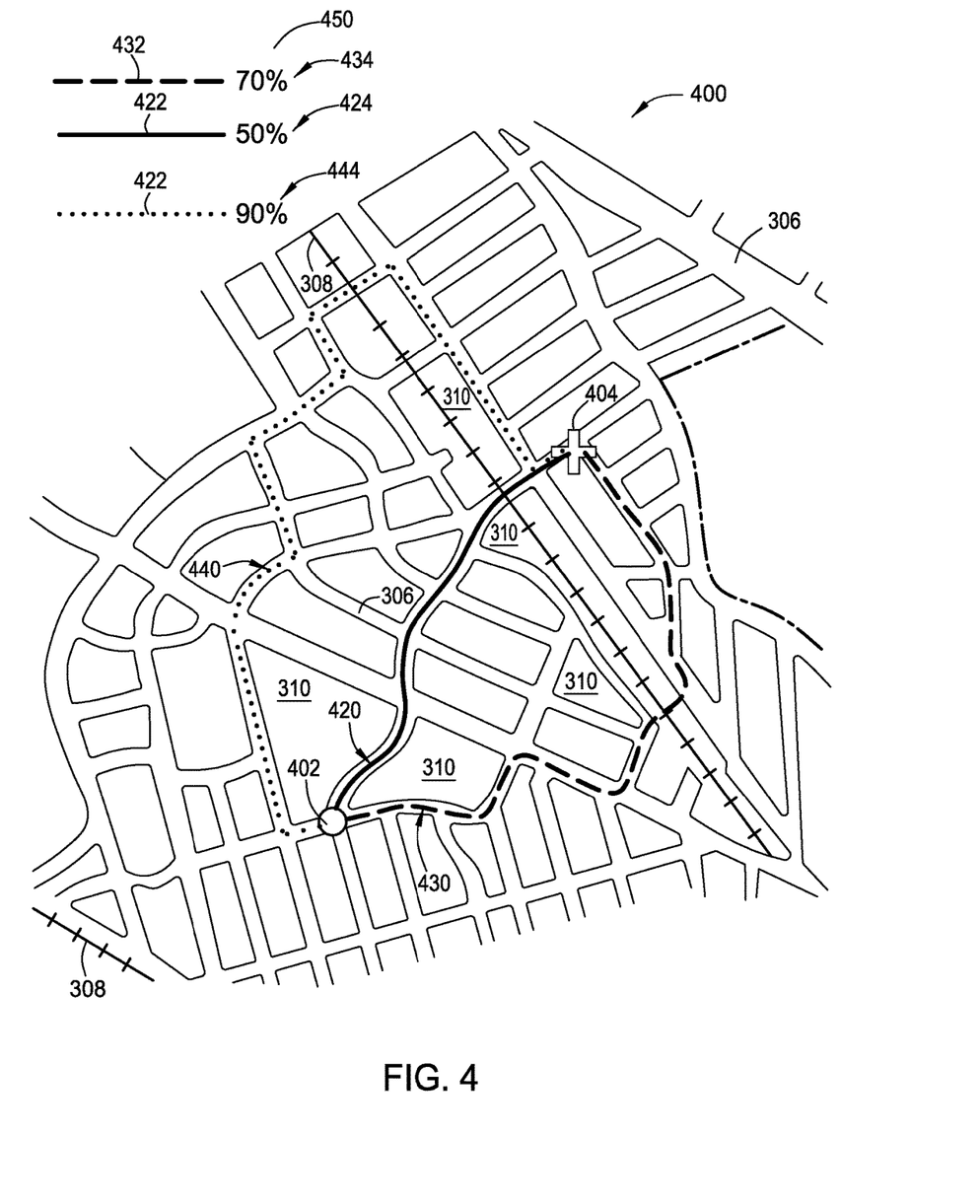
FIG. 4 is an exemplary map with multiple candidate paths, wherein the candidate paths are ordered based on a combination of travel distance and path reliability scores.

FIG. 4 illustrates another exemplary scenario, according to one embodiment, in which a user belonging to a particular mobility class is provided with three candidate paths 420, 430, and 440 from a current location 402 to a destination location 404 within a geographical area 400. In the illustrated scenario, the first candidate path 420 is the shortest path, but has a path reliability score of 50% (as indicated by the legend entries 422 and 424 of legend 450). The second candidate path 430 has a longer travel distance than the first candidate path 420, but has a path reliability score of 70% (as indicated by the legend entries 432 and 434 of the legend 450). The third candidate path 440 has the longest travel distance, but has a path reliability score of 90% (as indicated by the legend entries 442 and 444 of legend 450). In this embodiment, the candidate paths are ordered based on a combination of travel distance and reliability score. As a result, the legend entries 432 and 434 for the second candidate path 430 are displayed in the legend 450 first due to the balance between travel distance and reliability. The legend entries 422 and 424 for the first candidate path 420 are displayed in the legend 450 second due to the significantly-decreased path reliability score despite the reduced travel distance. The legend entries 442 and 444 for the third candidate path 440 are displayed in the legend 450 last due to the significantly-increased travel distance despite the improved path reliability score. The above described trade-offs and implied weightings are for example only. Suitable weightings between travel time, travel distance, and/or path reliability scores used to order candidate paths may vary depending on circumstances.

Figure 5:
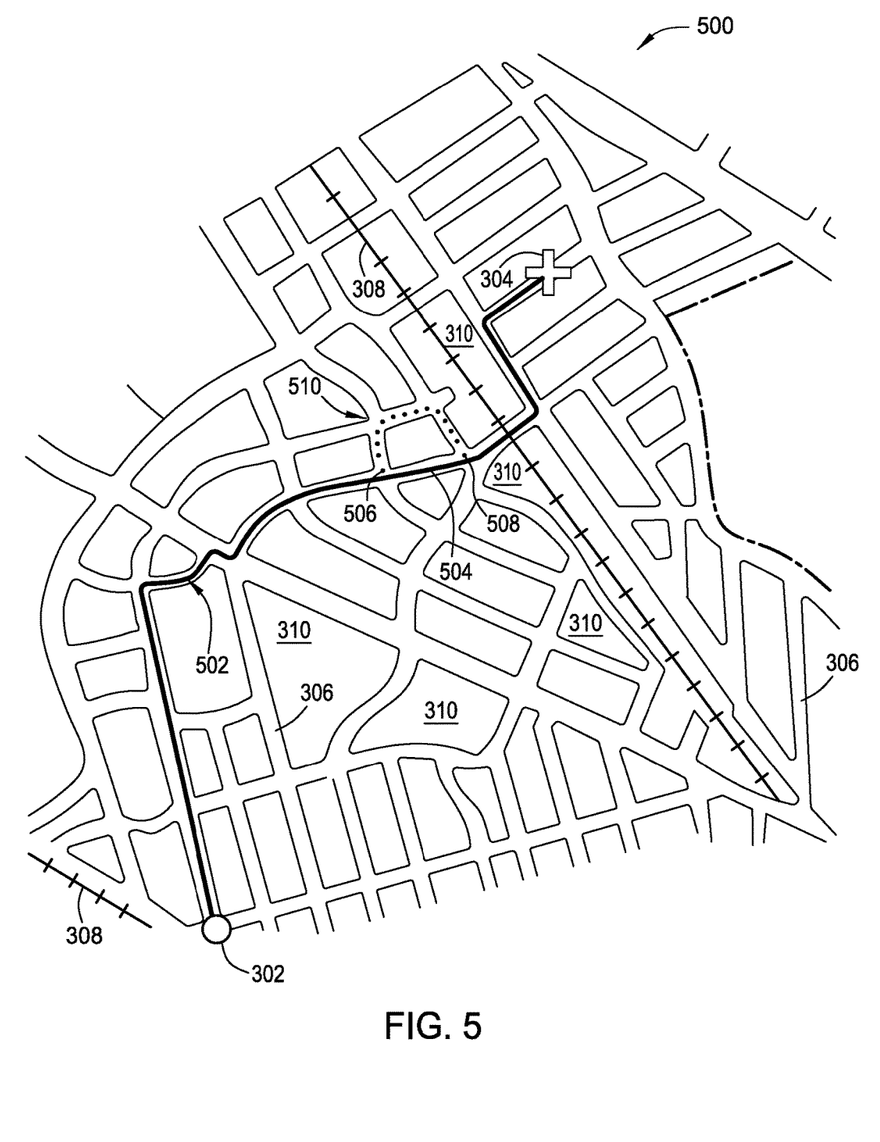
FIG. 5 is an exemplary map with a candidate path, wherein a user deviates from the candidate path.

FIG. 5 illustrates how a reliability score may be increased or decreased. In the scenario depicted in FIG. 5, a user associated with a particular mobility class is traveling from the current location 302 to the destination location 304 shown in FIG. 3 along a candidate path 502. In this scenario, the user deviates from the candidate path 502 to travel along a deviated path 510 (indicated by broken line). In this scenario, reliability scores for geographical features around which the user deviated can be decreased. For example, the candidate path 502 could include a sidewalk 504 and sidewalk curbs 506 and 508 that were part of the candidate path 502 but from which the user deviated. As a result, reliability scores for the sidewalk 504 and sidewalk curbs 506 and 508 could be decreased. In the event a subsequent user of the same mobility class request turn-by-turn directions and a candidate path uses the sidewalk 504 and/or the sidewalk curbs 506 and 508, the reliability scores for the sidewalk 504 and sidewalk curbs 506 and 508 would be used to calculate a path reliability score for that subsequent user's candidate path.

The reliability scores for the geographical features can be increased in a similar manner. Suppose that yet another subsequent user of the same mobility class does traverse the sidewalk curbs 506 and 508 and the sidewalk 504. In such a scenario, the reliability scores for the sidewalk 504 and sidewalk curbs 506 and 508 could be increased. Thereafter, in the event yet another subsequent user of the same mobility class request turn-by-turn directions and a candidate path uses the sidewalk 504 and/or the sidewalk curbs 506 and 508, the increased reliability scores for the sidewalk 504 and/or the sidewalk curbs 506 and 508 would be used to calculate a path reliability score for that candidate path.

In the above-described embodiments, a user with mobility disabilities is provided with turn-by-turn directions that account for difficulties resulting from the disabilities.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the application 116) or related data available in the cloud. For example, the application 116 could execute on a computing system in the cloud and output turn-by-turn directions to mobile devices 130.

While the foregoing is directed to embodiments of the present invention, other and further embodiments of the invention may be devised without departing from the basic scope thereof, and the scope thereof is determined by the claims that follow.

What is claimed is:

1. A method, comprising:
   for a geographical area comprising a plurality of geographical features:
      receiving tracking progress data for a plurality of users associated with a first mobility class along respective calculated paths to destinations in the geographical area; and
      upon the received tracking progress data indicating that one or more users of the first mobility class have deviated from the respective calculated paths, decreasing reliability scores for geographical features within the geographical area from which the users deviated;
   receiving a destination location from a first subject user, wherein the first subject user is associated with the first mobility class;
   calculating a plurality of candidate paths from a current location of the first subject user to the received destination location;
   calculating respective path reliability scores for the calculated plurality of candidate paths, based on the respective reliability scores for the geographical features included in the candidate paths;
   ordering the plurality of candidate paths based on at least one of the path reliability scores, total distances traveled for the candidate paths, or times of travel for the candidate paths; and outputting the ordered plurality of candidate paths for display to the first subject user.

2. The method of claim 1, further comprising:
receiving a selection of one of the plurality of candidate paths;
receiving tracking progress data for the first subject user along the selected one of the plurality of candidate paths; and
upon the first subject user deviating from the selected one of the plurality of candidate paths, decreasing reliability scores for geographical features within the geographical area from which the first subject user deviated.

3. The method of claim 1, wherein decreasing reliability scores for geographical features within the geographical area from which the users deviated comprises incrementally decreasing the respective reliability scores for the geographical features by a predetermined amount when a first one of the plurality of users deviates from the geographical features.

4. The method of claim 3, wherein decreasing reliability scores for geographical features within the geographical area from which the users deviated further comprises incrementally decreasing the respective reliability scores for the geographical features by the predetermined amount when a second one of the plurality of users deviates from the geographical features.

5. The method of claim 1, further comprising, upon receiving tracking progress data for a user from the plurality of users along a candidate path in which the user does not deviate from a geographical feature with a decreased reliability score, increasing the reliability score for the geographical feature.

6. The method of claim 5, wherein increasing the reliability score for the geographical feature comprises increasing the reliability score by a predetermined incremental amount.

7. The method of claim 5, wherein increasing the reliability score for the geographical feature comprises increasing the reliability score to a full amount.

8. The method of claim 1, further comprising:
for the geographical area:
receiving tracking progress data for another plurality of users associated with a second mobility class along respective calculated paths to destinations in the geographical area; and,
upon the received tracking progress data indicating that one or more users from the second mobility class have deviated from the respective calculated paths, decreasing second path reliability scores for geographical features within the geographical area from which the users deviated;
receiving a destination location from a second subject user, wherein the second subject user is associated with the second mobility class;
calculating a second plurality of candidate paths from a second current location of the second subject user to the received destination location;
calculating respective second path reliability scores for the calculated second plurality of candidate paths, based on the respective reliability scores for the geographical features included in the second candidate paths;
ordering the second plurality of candidate paths based on at least one of the second path reliability scores, second total distances traveled for the second candidate paths, or second times of travel for the second candidate paths; and
outputting the ordered plurality of candidate paths for display to the second subject user.

9. A system, comprising:
a computer processor;
an input operable to:
receive tracking progress data from a plurality of mobile devices carried by respective users, wherein the plurality of mobile devices are configured to identify mobility classes of the respective users; and
receive destination information and candidate path selections from the mobile devices;
an output operable to communicate candidate paths to the mobile devices;
computer memory storing:
a data structure of geographical features within a geographical area and respective reliability scores associated with the geographical features; and
an application, executable on the computer processor to:
analyze received tracking progress data for a plurality of mobile devices associated with a first mobility class along respective calculated paths to destinations;
upon the tracking progress data indicating that one or more users of the plurality of mobile devices have deviated from the respective calculated paths, decrease reliability scores for geographical features within the geographical area from which the users deviated;
receive a destination location from a subject mobile device, wherein a first subject user of the subject mobile device is associated with the first mobility class;
calculate a plurality of candidate paths from a current location of the subject mobile device to the received destination location;
calculate respective path reliability scores for the calculated plurality of candidate paths, based on the respective reliability scores for the geographical features included in the candidate paths;
order the plurality of candidate paths based on at least one of the path reliability scores, total distances traveled for the candidate paths, or times of travel for the candidate paths; and
output the ordered plurality of candidate paths to the subject mobile device.

10. The system of claim 9, wherein the application is further executable to:
receive a selection of one of the plurality of candidate paths;
receive tracking progress data for the first subject user along the selected one of the plurality of candidate paths; and
upon the first subject user deviating from the selected one of the plurality of candidate paths, decrease reliability scores for geographical features within the geographical area from which the first subject user deviated.

11. The system of claim 9, wherein decreasing reliability scores for geographical features within the geographical area from which the one or more users deviated comprises incrementally decreasing the respective reliability scores for the geographical features by a predetermined amount when a first one of the plurality of users deviates from the geographical features.

12. The system of claim 11, wherein decreasing reliability scores for geographical features within the geographical area from which the one or more users deviated further comprises incrementally decreasing the respective reliability scores for the geographical features by the predetermined amount when a second one of the plurality of users deviates from the geographical features.

13. The system of claim 9, wherein the application is further executable to: upon receiving tracking progress data for a user along a candidate path in which the user does not deviate from a geographical feature with a decreased reliability score, increase the reliability score for the geographical feature.

14. The system of claim 9, wherein the application is further executable to:
  analyze received tracking progress data for another plurality of users associated with a second mobility class along respective calculated paths to destinations;
  upon the tracking progress data indicating that one or more users from the second mobility class have deviated from the respective calculated paths, decrease second path reliability scores for geographical features within the geographical area from which the users deviated;
  receive a destination location from a second subject mobile device, wherein the second subject mobile device is associated with a second subject user of the second mobility class;
  calculate a second plurality of candidate paths from a current location of the second subject user to the received destination location;
  calculate respective second path reliability scores for the calculated second plurality of candidate paths, based on the respective reliability scores for the geographical features included in the second candidate paths;
  order the second plurality of candidate paths based on at least one of the second path reliability scores, second total distances traveled for the second candidate paths, or second times of travel for the second candidate paths; and
  output the ordered plurality of candidate paths to the second subject mobile device.

15. A computer program product for providing turn-by-turn directions to users, the computer program product comprising a computer-readable storage medium having program instructions embodied therewith, the program instructions executable by a processor to perform an operation comprising:
  receiving tracking progress data for a plurality of users associated with a first mobility class along respective calculated paths to destinations within a geographical area comprising a plurality of geographical features;
  upon the tracking progress data indicating that one or more users of the mobility class have deviated from the respective calculated paths, decreasing reliability scores for geographical features within the geographical area from which the users deviated;
  receiving a destination location from a first subject user, wherein the first subject user is associated with the first mobility class;
  calculating a plurality of candidate paths from a current location of the first subject user to the received destination location;
  calculating respective path reliability scores for the calculated plurality of candidate paths, based on the respective reliability scores for the geographical features included in the candidate paths;
  ordering the plurality of candidate paths based on at least one of the path reliability scores, total distances traveled for the candidate paths, or times of travel for the candidate paths; and
  outputting the ordered plurality of candidate paths for display to the first subject user.

16. The computer program product of claim 15, wherein the operations further comprise:
  receiving a selection of one of the plurality of candidate paths;
  receiving tracking progress data for the first subject user along the selected candidate path; and
  upon the first subject user deviating from the selected candidate path, decreasing reliability scores for geographical features within the geographical area from which the first subject user deviated.

17. The computer program product of claim 15, wherein decreasing reliability scores for geographical features within the geographical area from which the users deviated comprises incrementally decreasing the respective reliability scores for the geographical features by a predetermined amount when a first one of the plurality of users deviates from the geographical features.

18. The computer program product of claim 17, wherein decreasing reliability scores for geographical features within the geographical area from which the users deviated further comprises incrementally decreasing the respective reliability scores for the geographical features by the predetermined amount when a second one of the plurality of users deviates from the geographical features.

19. The computer program product of claim 15, wherein the operations further comprise:
  increasing the reliability score for the geographical feature upon receiving tracking progress data for a user along a candidate path in which the user does not deviate from a geographical feature with a decreased reliability score.

20. The computer program product of claim 15, wherein the operations further comprise:
  receiving tracking progress data for another plurality of users associated with a second mobility class along respective calculated paths to destinations within the geographical area;
  upon the tracking progress data indicating that one or more users from the second mobility class have deviated from the respective calculated paths, decreasing second path reliability scores for geographical features within the geographical area from which the users deviated;
  receiving a destination location from a second subject user, wherein the second subject user is associated with the second mobility class;
  calculating a second plurality of candidate paths from a current location of the second subject user to the received destination location;
  calculating respective second path reliability scores for the calculated second plurality of candidate paths, based on the respective reliability scores for the geographical features included in the second candidate paths;
  ordering the second plurality of candidate paths based on at least one of the second path reliability scores, second total distances traveled for the second candidate paths, or second times of travel for the second candidate paths; and outputting the ordered plurality of candidate paths for display to the second subject user.

\* \* \* \* \*